BEST AVAILABLE COPY
J. Bryant,
Windlass.
No 175. A.I. Patented Aug. 11, 1857.
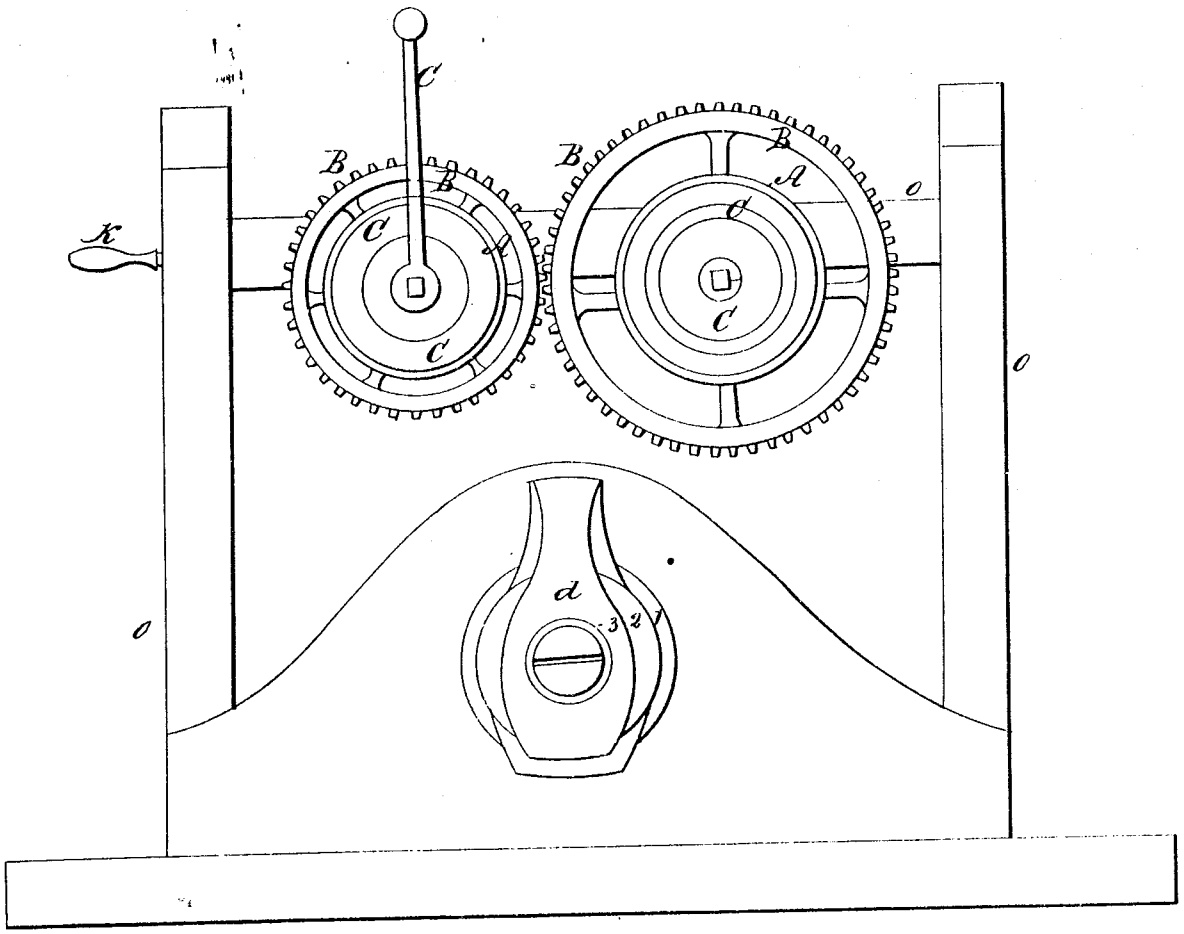
AM. PHOTO-LITHO. CO. N.Y. (OSBORNE'S PROCESS)